(12) United States Patent
Kim et al.

(10) Patent No.: US 12,062,492 B2
(45) Date of Patent: Aug. 13, 2024

(54) MULTILAYER CERAMIC ELECTRONIC COMPONENT

(71) Applicant: SAMSUNG ELECTRO-MECHANICS CO., LTD., Suwon-si (KR)

(72) Inventors: Jun Oh Kim, Suwon-si (KR); Byung Kun Kim, Suwon-si (KR); Yu Hong Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 136 days.

(21) Appl. No.: 17/960,178

(22) Filed: Oct. 5, 2022

(65) Prior Publication Data
US 2023/0207195 A1   Jun. 29, 2023

(30) Foreign Application Priority Data

Dec. 28, 2021   (KR) .................. 10-2021-0189701

(51) Int. Cl.
*H01G 4/008* (2006.01)
*H01G 4/012* (2006.01)
*H01G 4/12* (2006.01)
*H01G 4/30* (2006.01)

(52) U.S. Cl.
CPC ............ *H01G 4/008* (2013.01); *H01G 4/012* (2013.01); *H01G 4/1227* (2013.01); *H01G 4/30* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

| | | | |
|---|---|---|---|
| 2016/0276102 A1 | 9/2016 | Suzuki et al. | |
| 2019/0304695 A1* | 10/2019 | Kim | H01G 4/30 |
| 2019/0304696 A1* | 10/2019 | Kim | H01G 4/12 |
| 2020/0058444 A1 | 2/2020 | Cha et al. | |
| 2023/0207211 A1* | 6/2023 | Oh | H01G 4/30 |
| | | | 361/301.4 |

FOREIGN PATENT DOCUMENTS

| | | |
|---|---|---|
| KR | 10-2016-0085296 A | 7/2016 |
| KR | 10-2020-0044767 A | 4/2020 |
| KR | 10-2105057 B1 | 4/2020 |

\* cited by examiner

*Primary Examiner* — Nathan Milakovich
(74) *Attorney, Agent, or Firm* — Morgan, Lewis & Bockius LLP

(57) ABSTRACT

A multilayer ceramic electronic component includes a body including a dielectric layer and an internal electrode alternately disposed with the dielectric layer in a first direction; and an external electrode disposed on the body and connected to the internal electrode, wherein the internal electrode includes a plurality of Ni crystal grains, and a composite layer including Ni and In is provided at a grain boundary of each of the plurality of Ni crystal grains.

21 Claims, 10 Drawing Sheets

MULTILAYER CERAMIC ELECTRONIC COMPONENT

CROSS-REFERENCE TO RELATED APPLICATION(S)

This application claims benefit of priority to Korean Patent Application No. 10-2021-0189701 filed on Dec. 28, 2021 in the Korean Intellectual Property Office, the disclosure of which is incorporated herein by reference in its entirety.

TECHNICAL FIELD

The present disclosure relates to a multilayer ceramic electronic component.

BACKGROUND

A multilayer capacitor, a type of multilayer ceramic electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such a multilayer capacitor may be used as a component of various electronic devices due to its relatively small size, relatively high capacity, and relative ease of mounting. As sizes of the components of electronic devices decrease, demand for decreasing the size and increasing the capacity of multilayer capacitors is increasing.

In order to decrease the size and increase the capacity of a multilayer ceramic capacitor, a technology capable of reducing a thickness of an internal electrode and a thickness of a dielectric layer is required.

In general, in order to make the internal electrode thinner, it may be necessary to use a finer metal powder particle than an existing metal powder particle. This is because 5 to 6 fine metal powder particles should be present in the thickness direction of the thinly printed internal electrode to suppress a breakage phenomenon during a shrinkage process.

However, there was a problem that, when a finer metal powder particle than an existing metal powder particle needs to be used, a difference in contraction behavior between the internal electrode and the ceramic layer increases because the contraction start temperature moves to a lower temperature, which leads to an aggregation phenomenon of the internal electrode and a breakage phenomenon of the internal electrode during a shrinkage process.

SUMMARY

An aspect of the present disclosure is to provide a small, highly reliable, and high-capacity multilayer ceramic electronic component by suppressing breakage and aggregation phenomena of an electrode.

According to an aspect of the present disclosure, a multilayer ceramic electronic component includes a body including a dielectric layer and an internal electrode alternately disposed with the dielectric layer in a first direction; and an external electrode disposed on the body and connected to the internal electrode, wherein the internal electrode includes a plurality of Ni crystal grains, and a composite layer including Ni and In is provided at a grain boundary of each of the plurality of Ni crystal grains.

According to an aspect of the present disclosure, a multilayer ceramic electronic component includes a body including a dielectric layer and an internal electrode alternately disposed with the dielectric layer in a first direction, wherein the internal electrode includes at least one Ni crystal grain, a composite layer including Ni and In is disposed at a grain boundary of the at least one Ni crystal grain, and an In content relative to Ni in the composite layer is 1.0 to 2.5 wt %; and an external electrode disposed on the body and connected to the internal electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
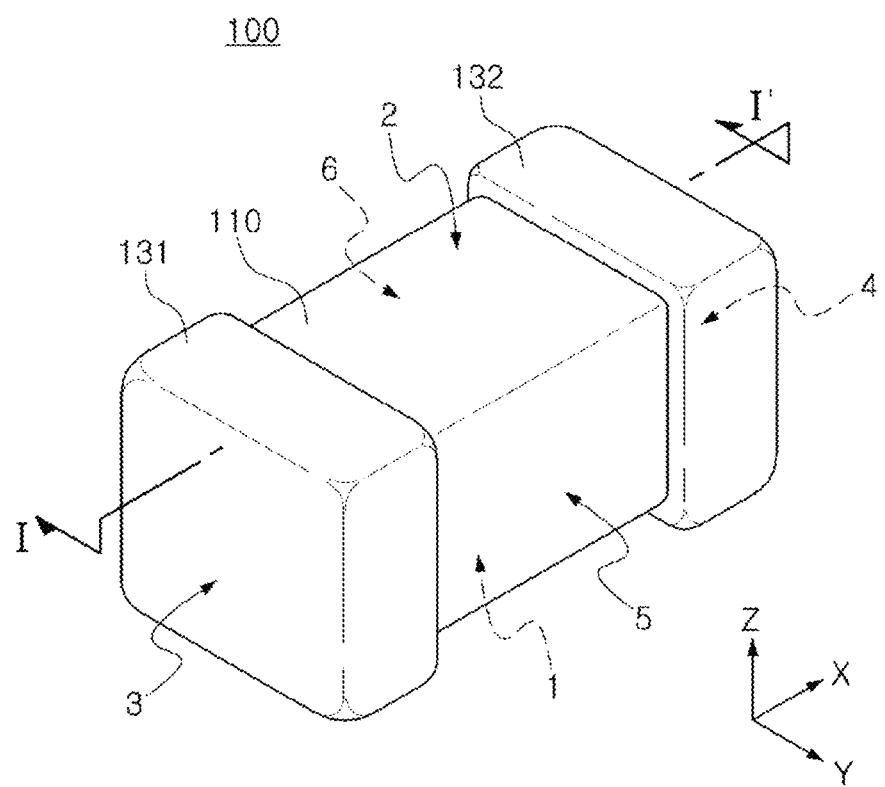
FIG. 1 is a perspective view schematically illustrating a multilayer ceramic electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, an X-direction may be defined as a first direction, an L direction, or a longitudinal direction, a Y-direction may be defined as a second direction, a W direction, or a width direction, and a Z-direction may be defined as a third direction, a T direction, or a thickness direction.

Multilayer Ceramic Electronic Component

FIG. 1 is a perspective view schematically illustrating a multilayer ceramic electronic component according to an embodiment of the present disclosure.

Figure 2:
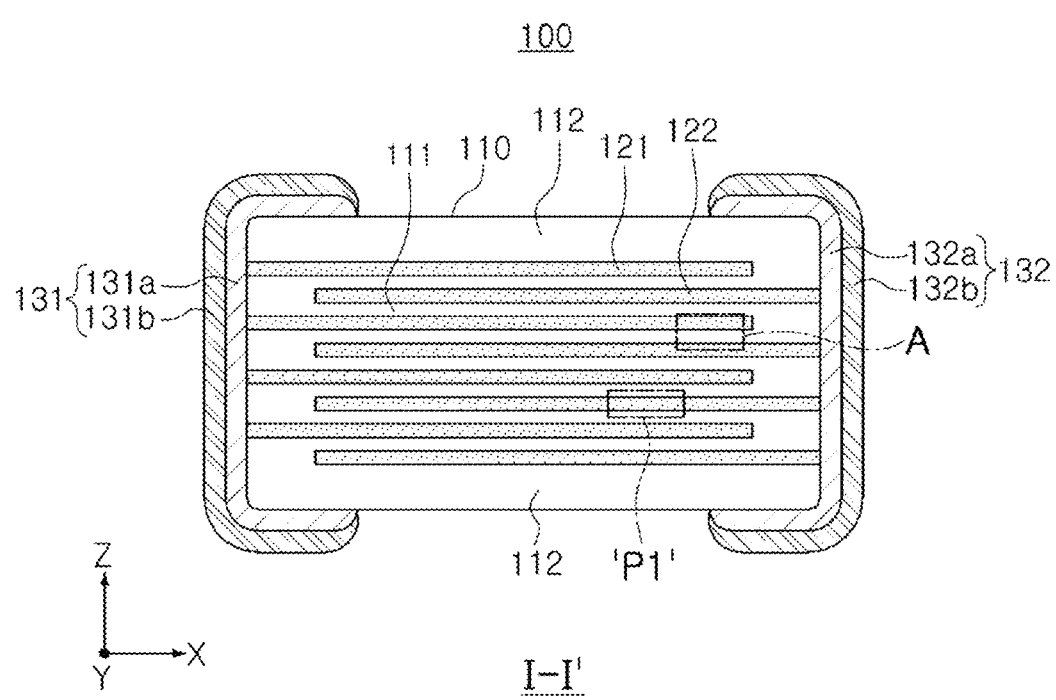
FIG. 2 is a cross-sectional view of FIG. 1, taken along line I-I'.

FIG. 2 is a cross-sectional view of FIG. 1, taken along line I-I'.

Figure 3A:
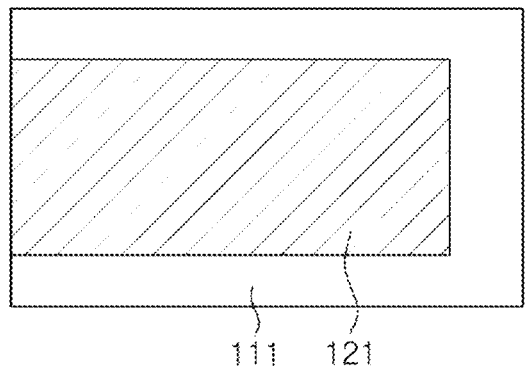
FIGS. 3A and 3B are each a view illustrating a ceramic green sheet for manufacturing a multilayer ceramic electronic component according to an embodiment of the present disclosure.
Figure 3B:
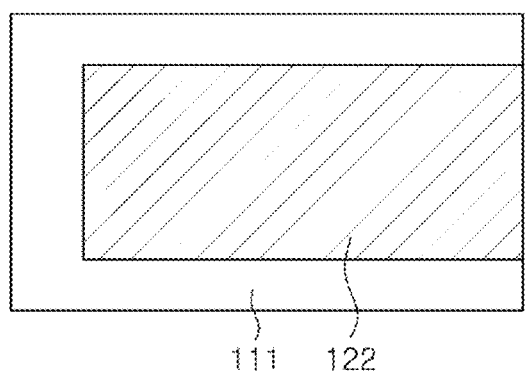

FIGS. 3A and 3B are each a view illustrating a ceramic green sheet for manufacturing a multilayer ceramic electronic component according to an embodiment of the present disclosure.

Figure 4:
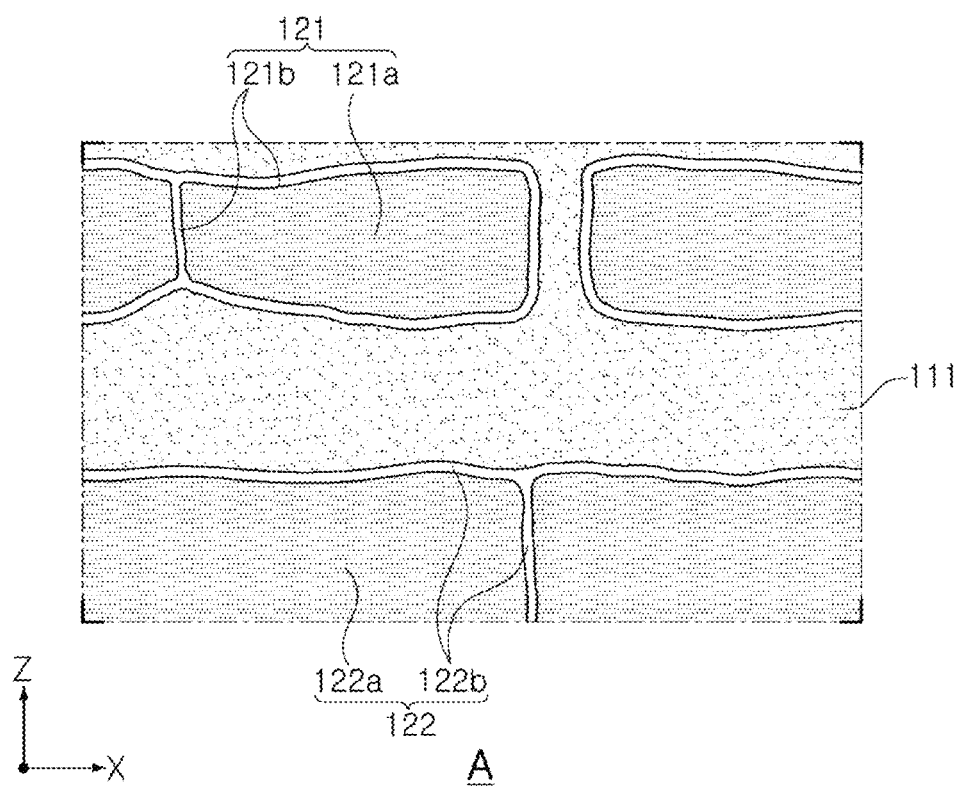
FIG. 4 is an enlarged view schematically illustrating portion 'A' of FIG. 2.
Figures 5A, 5B:
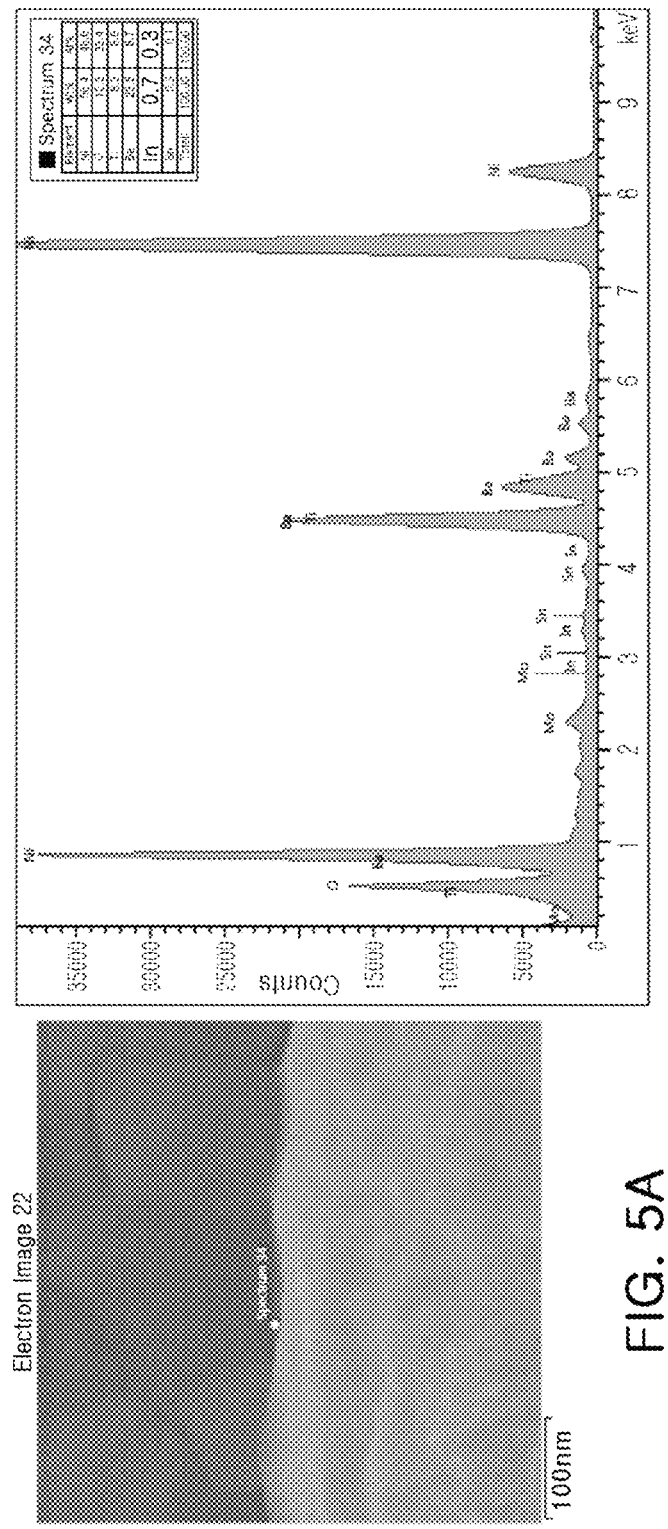
FIGS. 5A to 5H illustrate photographs of an internal electrode of a multilayer ceramic electronic component according to an embodiment of the present disclosure, and component analysis at a grain boundary of an Ni crystal grain.
Figures 5C, 5D:
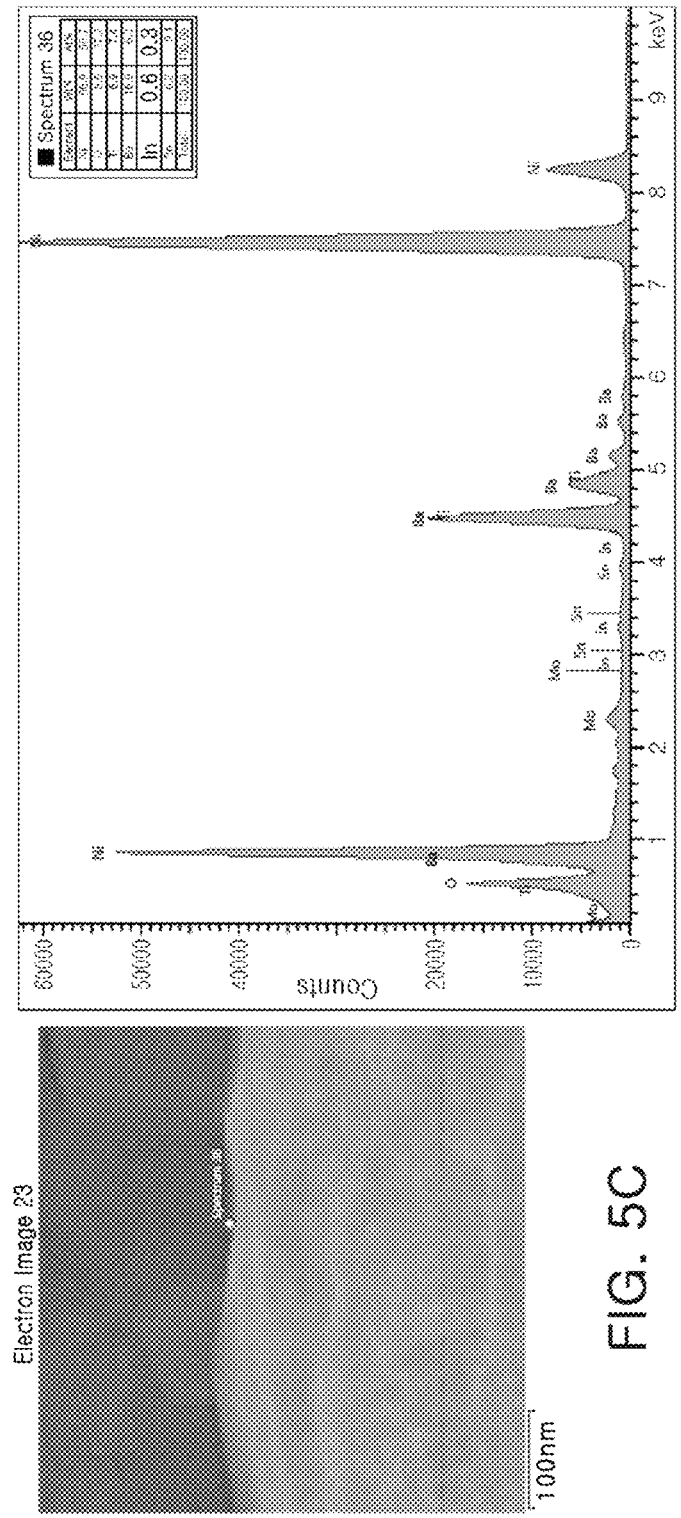
Figures 5E, 5F:
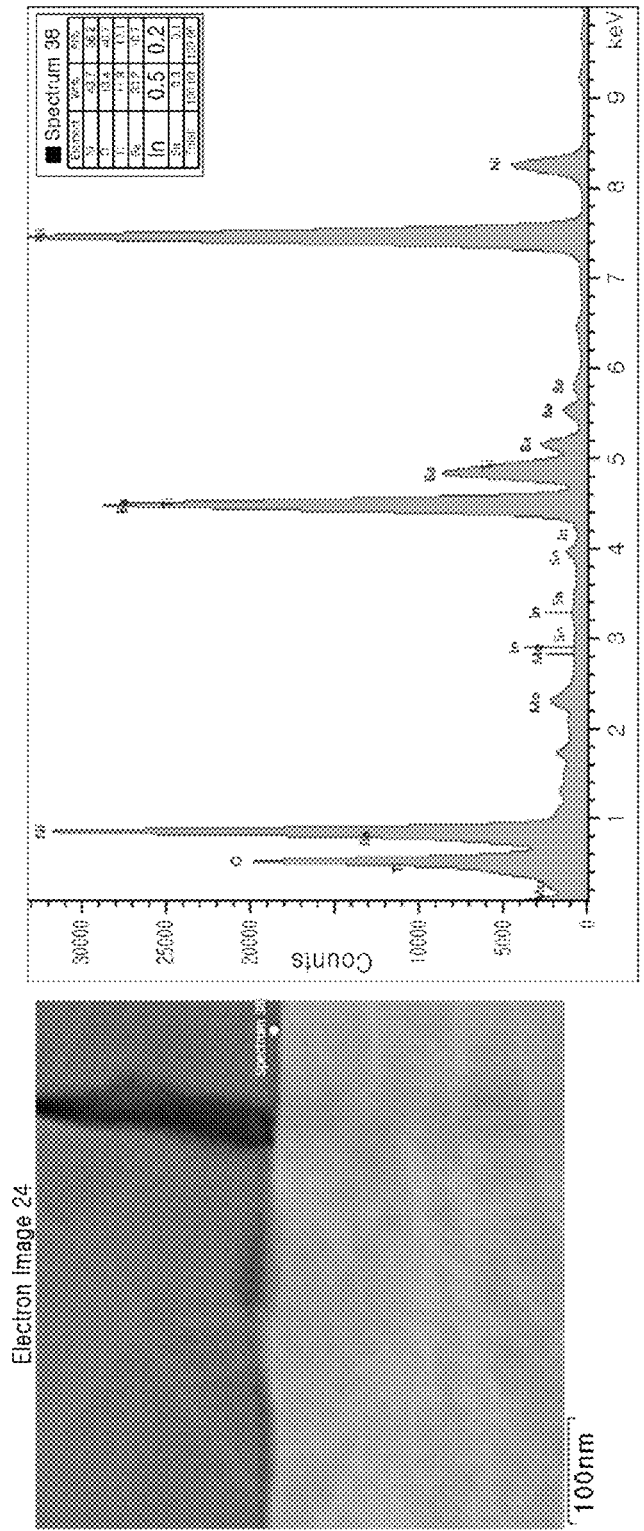
Figures 5G, 5H:
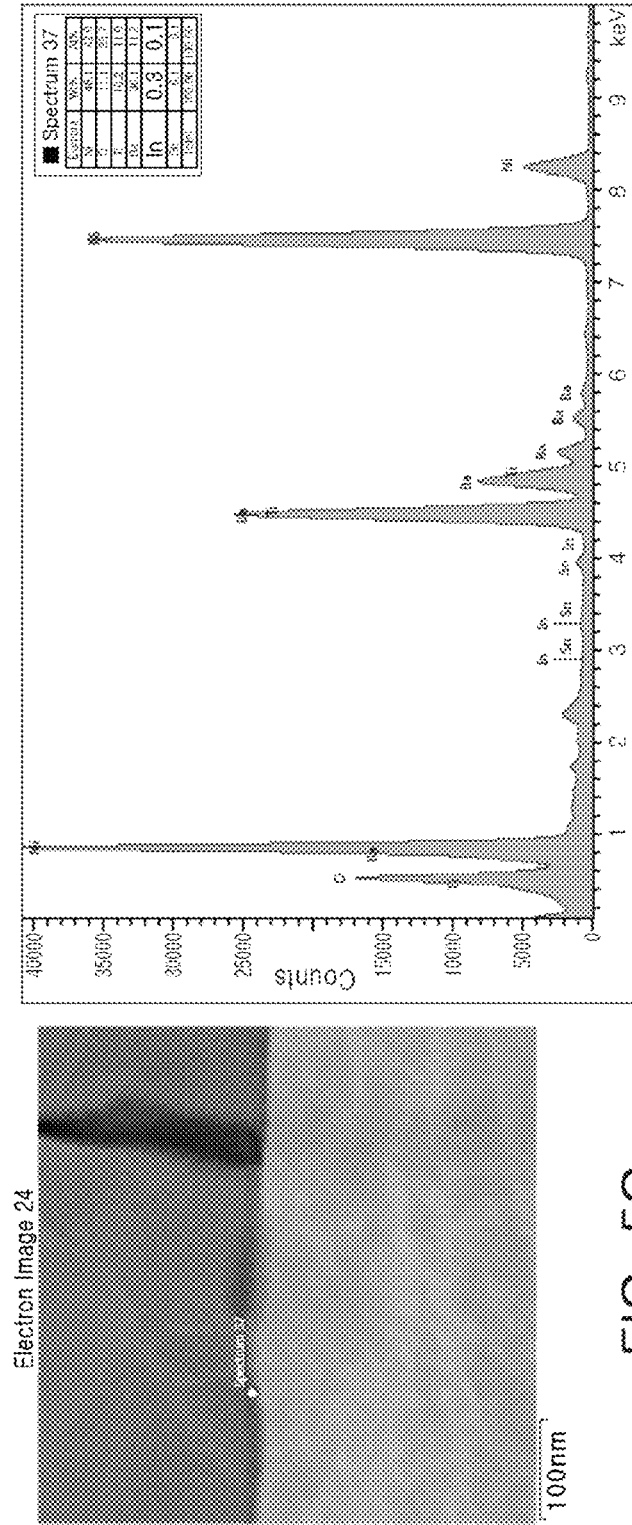

FIG. 4 is an enlarged view schematically illustrating portion 'A' of FIG. 2.

FIGS. 5A to 5H are photographs of an internal electrode and a dielectric layer of a multilayer ceramic electronic component according to an embodiment of the present disclosure.

Hereinafter, a multilayer ceramic electronic component according to an aspect of the present disclosure will be described in detail with reference to FIGS. 1 to 5H.

A multilayer ceramic electronic component 100 according to an embodiment of the present disclosure may include a body 110 including an internal electrode (121 or 122) alternately disposed with a dielectric layer 111; and an external electrode (131 or 132) disposed on the body 110 and connected to the internal electrode (121 or 122), as illustrated in FIGS. 1 and 2.

In addition, the internal electrode (121 or 122) may include a plurality of Ni crystal grains (e.g., 121a), and a composite layer (e.g., 121b) containing Ni and In may be provided at a grain boundary of each of the Ni crystal grains, as illustrated in FIG. 4.

In the body 110, the dielectric layer 111 and the internal electrode (121 or 122) may be alternately stacked.

Although the specific shape of the body 110 is not particularly limited, the body 110 may have a hexahedral shape or the like as illustrated. Due to shrinkage of ceramic powder particle particles included in the body 110 during a sintering process, the body 110 may not have a perfectly straight hexahedral shape, but may have a substantially hexahedral shape.

The body 110 may have first and second surfaces 1 and 2 opposing each other in the thickness direction (the Z-direction), third and fourth surfaces 3 and 4 connected to the first and second surfaces 1 and 2 and opposing each other in the longitudinal direction (the X-direction), and fifth and sixth surfaces 5 and 6 connected to the first to fourth surfaces 1, 2, 3, and 4, and opposing each other in the width direction (the Y-direction).

A plurality of dielectric layers 111 forming the body 110 may be in a sintered state, and a boundary between adjacent dielectric layers 111 may be integrated to such an extent that it is difficult to identify the device without using a scanning electron microscope (SEM).

A raw material for forming the dielectric layer 111 is not particularly limited, as long as sufficient capacitance may be obtained therewith, and may be, for example, barium titanate ($BaTiO_3$) powder particle. As the material for forming the dielectric layer 111, various ceramic additives, organic solvents, plasticizers, binders, dispersants, or the like may be added to powder particles formed of a material such as barium titanate ($BaTiO_3$) or the like according to the purpose of the present disclosure.

A cover layer 112 may be included by stacking dielectric layers on which internal electrodes are not formed in upper and lower portion of the body 110, e.g., both end portions in the thickness direction (the Z-direction), respectively. The cover layer 112 may serve to maintain reliability of the capacitor against external impact.

The cover layer 112 does not need to be particularly limited. To more easily achieve miniaturization and high capacity of the capacitor component, a thickness of the cover layer 112 may be 20 µm or less.

A thickness of the dielectric layer 111 does not need to be particularly limited. According to the present disclosure, since increases in electrode breakage and electrode aggregation may be effectively suppressed even when the dielectric layer and the internal electrode are very thin, the thickness of the dielectric layer 111 may be 0.4 µm or less to easily achieve miniaturization and high capacity of capacitor components. In this case, the thickness of the dielectric layer 111 may refer to an average thickness of the dielectric layer 111 disposed between a first internal electrode 121 and a second internal electrode 122.

The average thickness of the dielectric layer 111 may be measured by scanning an image of a length-thickness direction cross-section (the L-T plane; see FIG. 2) of the body 110 with a scanning electron microscope (SEM).

For example, with respect to an arbitrary dielectric layer extracted from an image in which the length-thickness direction cross-section (the L-T plane) cut in a central portion of the body 110 in the width direction (the Y-direction) is scanned with a scanning electron microscope (SEM), an average value may be determined by measuring thicknesses at 30 points equally spaced in the length direction.

The 30 equally spaced points may be measured in a capacitance formation portion, which means a region in which the first internal electrode 121 and the second internal electrode 122 overlap each other.

Next, the internal electrode (121 or 122) may be alternately stacked with the dielectric layer 111, and the body 110 may include the internal electrode (121 or 122) and the dielectric layer 111.

The first internal electrode 121 and the second internal electrode 122 may be alternately disposed to oppose each other with the dielectric layer 111, constituting the body 110, interposed therebetween, and may be exposed from the third and fourth surfaces 3 and 4, respectively.

In this case, the first internal electrode 121 and the second internal electrode 122 may be electrically separated from each other by the dielectric layer 111 interposed therebetween.

Referring to FIGS. 3A and 3B, the body 110 may be formed by alternately stacking a ceramic green sheet (a) on which the first internal electrode 121 is printed and a ceramic green sheet (b) on which the second internal electrode 122 is printed, and sintering the same.

Referring to FIG. 4, the internal electrode (121 or 122) may include a plurality of Ni crystal grains (121a or 122a), and a composite layer (121b or 122b) including Ni and In may be provided at a grain boundary of each of the plurality of Ni crystal grains.

As the multilayer ceramic electronic component is miniaturized, decreases in thickness of a dielectric material and an internal electrode material may be further required, to increase capacity per unit area. As the dielectric material and the internal electrode material become thinner, a breakage phenomenon may occur, especially in the electrode material therein. This may be a phenomenon that occurs because the internal electrode material has a relatively low sintering temperature, compared to the dielectric material, and may be worsen as a fine metal powder particle is used to make a thin internal electrode.

In general, in order to make the internal electrode thinner, it is necessary to use a finer metal powder particle than the conventional one. There may be a problem in that, when a finer metal powder particle than the conventional one is used, a difference in shrinkage behavior between the internal electrode and the dielectric layer may increase, such that an aggregation phenomenon of the internal electrode and a breakage phenomenon of the internal electrode become severe during a shrinkage process.

To solve this problem, conventionally, techniques using Sn as an internal electrode material have been studied. When Sn is used as the internal electrode material, there may be a limit to a level of reliability that may be secured. Therefore, the present inventors have repeated research to include In at a grain boundary of Ni crystal grains to secure a higher level of reliability.

Figure 6:
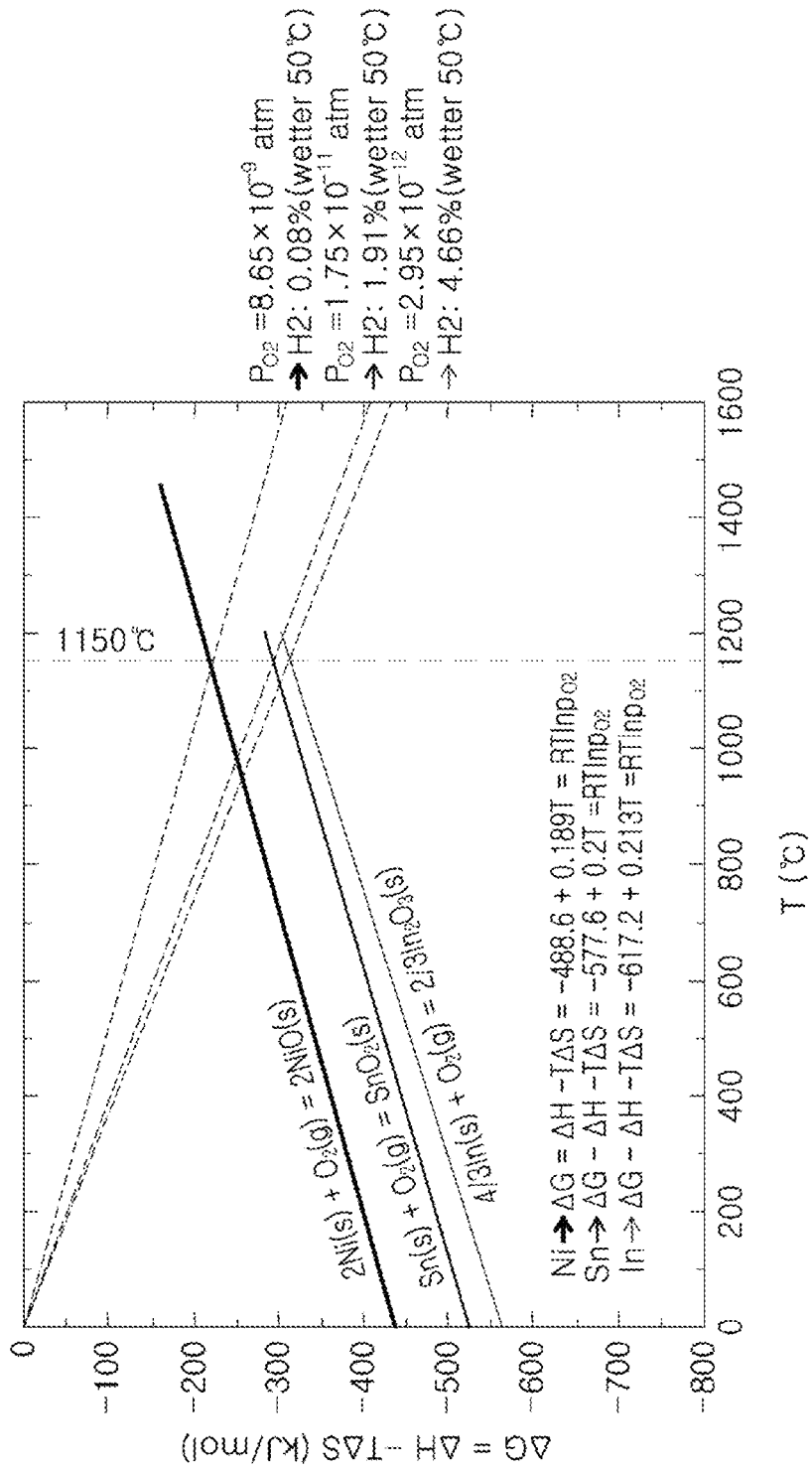
FIG. 6 is an Ellingham diagram for determining a sintering condition of a multilayer ceramic electronic component.

In general, a multilayer ceramic electronic component may be sintered, in a reducing atmosphere slightly higher than the standard of $2Ni(s)+O_2(g)=2NiO(s)$ on the Ellingham diagrams illustrated in FIG. 6 (for example, in FIG. 6, a condition having an oxygen partial pressure of $8.65 \times 10^{-9}$ atm and a temperature of 1150° C.), in order to prevent oxidation of Ni.

In the present disclosure, sintering may be performed for several tens of minutes in a strongly reducing atmosphere satisfying oxygen partial pressure $1.75 \times 10^{-11}$ atm to $2.95 \times 10^{-12}$ atm between $Sn(s)+O_2(g)=SnO_2(s)$ and $4/3In(s)+O_2(g)=2/3In_2O_3$ (g) on the Ellingham diagrams illustrated in FIG. 6. Through this, In, a material that may be difficult to reduce, may exist in a form of an oxide at an interface between the dielectric layer and the internal electrode or at a grain boundary of Ni crystal grains.

In this case, the Ni crystal grains (121a or 122a) may be a polyhedron made by regularly arranging Ni atoms, and the composite layer (121b or 122b) including Ni and In surround the Ni crystal grains (121a or 122a). For example, the composite layer (121b or 122b) including Ni and In may completely surround at least one of the Ni crystal grains.

The composite layer (121b or 122b) including Ni and In may serve to inhibit growth of the Ni crystal grains (121a or 122a) externally, and may suppress a decrease (spheroidization) in surface area of nickel according to an increase in the sintering temperature, to improve a breakage phenomenon of the internal electrode and an aggregation phenomenon of the internal electrode.

FIGS. 5A to 5H illustrate photographs of an internal electrode of a multilayer ceramic electronic component according to an embodiment of the present disclosure, and component analysis at a grain boundary of an Ni crystal grain, using a transmission electron microscope (TEM) and an energy disperse X-Ray Spectrometer (EDS).

Referring to FIGS. 5A to 5H, it can be seen that an internal electrode of a multilayer ceramic electronic component according to the present disclosure includes a plurality of Ni crystal grains (121a or 122a), and a composite layer (121b or 122b) including Ni and In is provided at a grain boundary of each of the Ni crystal grains.

If a ratio of a length of a portion in which an internal electrode (121 or 122) is actually formed with respect to a total length of the internal electrode (121 or 122) is defined as connectivity (C) of the internal electrode, the composite layer (121b or 122b) including Ni and In in the grain boundary described above may suppress growth of the Ni crystal grains (121a or 122a) externally and may suppress a decrease (spheroidization) in surface area of nickel according to an increase in sintering temperature, such that the internal electrode (121 or 122) satisfies 85%<C.

According to an embodiment of the present disclosure, the composite layer (121b or 122b) may have an average thickness of 1 to 5 nm.

When the average thickness of the composite layer (121b or 122b) is less than 1 nm, growth of the Ni crystal grains (121a or 122a) externally and a decrease (spheroidization) in surface area of nickel due to an increase in sintering temperature may not be sufficiently suppressed. When the average thickness of the composite layer (121b or 122b) exceeds 5 nm, a thickness of the composite layer (121b or 122b) may not be uniform, such that effects of suppressing growth of the Ni crystal grains (121a or 122a) externally and a decrease (spheroidization) in surface area of nickel due to an increase in sintering temperature may be deteriorated.

The average thickness of the composite layer may be measured by scanning an image of a length-thickness direction cross-section (the L-T plane) of the body 110 with a scanning electron microscope (SEM).

For example, with respect to an arbitrary first internal electrode 121 and an arbitrary second internal electrode 122, extracted from an image in which the length-thickness direction cross-section (the L-T plane) cut in a central portion of the body 110 in the width direction (the Y-direction) is scanned with a scanning electron microscope (SEM), an average value may be determined by measuring thicknesses of composite layers at 30 points equally spaced apart in the longitudinal direction.

According to an embodiment of the present disclosure, an In content relative to Ni (e.g., the content of Ni is taken to be 100 wt %) in the composite layer (121b or 122b) may be 0.1 wt % or more (or 0.1 to 2.5 wt %, or 1.0 to 2.5 wt %, or more than 1.0 wt % and 2.5 wt % or less, or more than 1.0 wt % and less than 2.5 wt %, or 1.0 to 2.0 wt %, or more than 1.0 wt % and 2.0 wt % or less, or more than 1.0 wt % and less than 2.0 wt %, or 1.0 to 1.5 wt %, or more than 1.0 wt % and 1.5 wt % or less). When the In content relative to Ni in the composite layer (121b or 122b) is less than 0.1 wt %, an effect of suppressing a decrease in surface area of nickel according to an increase in sintering temperature may be insufficient, and effects of improving a breakage phenomenon of the internal electrode and an aggregation phenomenon of the internal electrode may be insignificant. Since the above-described effect may be expressed by the inclusion of the In component in the grain boundary of the Ni crystal grains, an upper limit thereof may not be separately restricted. When the In content relative to Ni in the composite layer (121b or 122b) is excessive, reliability may be deteriorated, and thus the upper limit thereof may be set to 2.5 wt %. The In content may be determined by measuring the In and Ni contents in a cross section of the multilayer ceramic electronic component using scanning electron microscopy-energy dispersive spectroscopy (SEM-EDS), a transmission electron microscopy-energy dispersive spectroscopy (TEM-EDS) or the like. Other methods and/or tools appreciated by one of ordinary skill in the art, even if not described in the present disclosure, may also be used.

According to an embodiment of the present disclosure, an In content, for example, relative to Ni, included in the grain boundary of each of the Ni crystal grains may be higher than an In content, for example, relative to Ni, included in each of the Ni crystal grains. As described above, by sintering in an appropriate reducing atmosphere, In included in the grain boundaries of the Ni crystal grains may be present in a higher content than those in the Ni crystal grains, during a manufacturing process of the ceramic multilayer electronic component. As described above, since In exists more in the grain boundaries of the Ni crystal grains, the function of a decrease in surface area of nickel according to an increase in sintering temperature may be more effectively expressed. The In content may be determined by methods and/or tools disclosed herein and appreciated by one of ordinary skill in the art, even if not described in the present disclosure.

Alternatively, according to an embodiment of the present disclosure, an In content relative to Ni, in a region of the internal electrode within 3 nm of an interface between the dielectric layer and the internal electrode in a thickness direction of the internal electrode, and in a region of the internal electrode within 3 nm of an outline of each of the Ni crystal grains, may be 0.1 to 2.5 wt %. The In content may be determined by methods and/or tools disclosed herein and appreciated by one of ordinary skill in the art, even if not described in the present disclosure.

Alternatively, according to an embodiment of the present disclosure, the composite layer may have an In content of 0.3 to 0.7% and an Ni content of 43.7 to 66.9%, based on a total content of Ni, O, Ti, Ba, In, and Sn. In addition, the composite layer may further include at least one component selected from the group consisting of Sn, Ba, Ti, and O.

A thickness of the internal electrode (121 or 122) do not need to be particularly limited. According to the present disclosure, since increases in electrode breakage and electrode aggregation may be effectively suppressed even when the dielectric layer and the internal electrode are very thin, the thickness of the internal electrode (121 or 122) may be 0.4 μm or less to easily achieve miniaturization and high capacity of capacitor components. In this case, the thickness of the internal electrode (121 or 122) may refer to an average thickness of the first internal electrode 121 or an average thickness of the second internal electrode 122.

The average thickness of the first and second internal electrode (121 or 122) may be measured by scanning an image of a length-thickness direction cross-section (the L-T plane) of the body 110 with a scanning electron microscope (SEM).

For example, with respect to an arbitrary first internal electrode 121 and an arbitrary second internal electrode 122, extracted from an image in which the length-thickness direction cross-section (the L-T plane) cut in a central portion of the body 110 in the width direction (the Y-direction) is scanned with a scanning electron microscope (SEM), an average value of the first and second internal electrode (121 or 122) may be determined by measuring thicknesses of internal electrodes at 30 points equally spaced in the longitudinal direction. In this case, the 30 equally spaced points may be measured in a capacitance formation portion, which means a region in which the first internal electrode 121 and the second internal electrode 122 overlap each other.

According to an embodiment of the present disclosure, the internal electrode may be formed by a paste for the internal electrode including an Ni powder particle in which a coating layer containing In is formed as a surface of the Ni powder particle, or an Ni powder particle containing an In alloy. In this case, an In content relative to the Ni powder particle may be 0.1 wt % or more. As such, by using the Ni powder particle formed on the surface of the coating layer including In or the Ni powder particle containing an In alloy, sintering may be delayed regardless of dispersibility. The In content may be determined by measuring the In and Ni contents in the Ni powder particle using scanning electron microscopy-energy dispersive spectroscopy (SEM-EDS), a transmission electron microscopy-energy dispersive spectroscopy (TEM-EDS) or the like. Other methods and/or tools appreciated by one of ordinary skill in the art, even if not described in the present disclosure, may also be used.

The external electrode (131 or 132) may be disposed on the body 110, and may be connected to the internal electrode (121 or 122). As illustrated in FIG. 2, first and second external electrodes 131 and 132 respectively connected to the first and second internal electrodes 121 and 122 may be included. Although a structure in which the capacitor component 100 has the two external electrodes 131 and 132 is described in the present embodiment, the number, a shape, or the like of the external electrode (131 or 132) may depend on a shape of the internal electrode (121 or 122) or other purposes.

The external electrode (131 or 132) may be formed using any material, such as metal, as long as electrical conductivity is provided thereby, and a specific material may be determined in consideration of electrical characteristics, structural stability, or the like, and further may have a multilayer structure.

For example, the external electrode (131 or 132) may include an electrode layer (131a or 132a) disposed on the body 110, and a plating layer (131b or 132b) formed on the electrode layer (131a or 132a).

As a specific example of the electrode layer (131a or 132a), the electrode layer (131a or 132a) may be sintered electrodes including a conductive metal and glass, and the conductive metal may be Cu. In addition, the electrode layer (131a or 132a) may be resin-based electrodes including a plurality of metal particles and a conductive resin.

As a specific example of the plating layer (131b or 132b), the plating layer (131b or 132b) may be an Ni plating layer or an Sn plating layer, the Ni plating layer and the Sn plating layer may be sequentially formed on the electrode layer (131a or 132a), and may include a plurality of Ni plating layers and/or a plurality of Sn plating layers.

A size of a multilayer ceramic electronic component does not need to be particularly limited. To achieve miniaturization and high capacity at the same time, since it is necessary to increase the number to be stacked by reducing thicknesses of the dielectric layer and the internal electrode, effects of inhibiting increases in breakage and agglomeration of an electrode according to the present disclosure may be more pronounced. Therefore, the multilayer ceramic electronic component may have a length of 0.4 mm or less and a thickness of 0.2 mm or less.

Hereinafter, the present disclosure will be described in more detail through examples. However, it is necessary to note that the following examples may be only for explaining the present disclosure by way of illustration, and not for limiting the scope of the present disclosure. This may be because the scope of the present disclosure may be determined by the matters described in the claims and matters reasonably inferred therefrom.

(Example)

A sample chip including an internal electrode in which an In content relative to Ni at a grain boundary of Ni crystal grains satisfies Table 1 below was manufactured. The sample chip was manufactured by sintering the sample chip for 10 minutes while precisely controlling an oxygen partial pressure condition to about $10^{-9}$ to $10^{-10}$ atm.

Specimen No. 1 illustrates a case in which In was not added to the internal electrode paste.

In this case, the In content relative to Ni in the grain boundary of the Ni crystal grains may represent component analysis results with respect to an position corresponding to the grain boundary of the Ni crystal grains, using TEM and EDS.

Capacitance, MTTF, and electrode connectivity of each sample chip were measured. Relative values of other specimens are illustrated in Table 1 below, based on capacitance, MTTF, and electrode connectivity of specimen No. 1 in which In was not added to the internal electrode paste.

The capacitance was measured using an LCR meter under the conditions of 1 kHZ and AC 0.5V. Capacitance of specimen No. 1 was used as a reference value of 1, and relative values of other specimens are described.

The MTTF was measured by performing a high-temperature load test under the conditions of 125° C. and 8V for 400 sample chips per each specimen. In this case, a time point when insulation resistance became 10KΩ or less was taken as a failure time point, and relative values of other specimens were described, based on capacitance, MTTF, and electrode connectivity of specimen No. 1 as a reference value of 1.

The electrode connectivity may be defined as a ratio of a length of a portion in which an internal electrode is actually formed with respect to a total length of the internal electrode. An average value of electrode connectivity was derived and described by cutting a body of the sample chip according to each experimental example in a central portion of the body in the width direction (the Y-direction), scanning an image of length-thickness direction cross-section (the L-T plane) with a scanning electron microscope (SEM), and measuring a length of a portion in which an internal electrode is actually formed with respect to a total length of the internal electrode.

Figure 7:
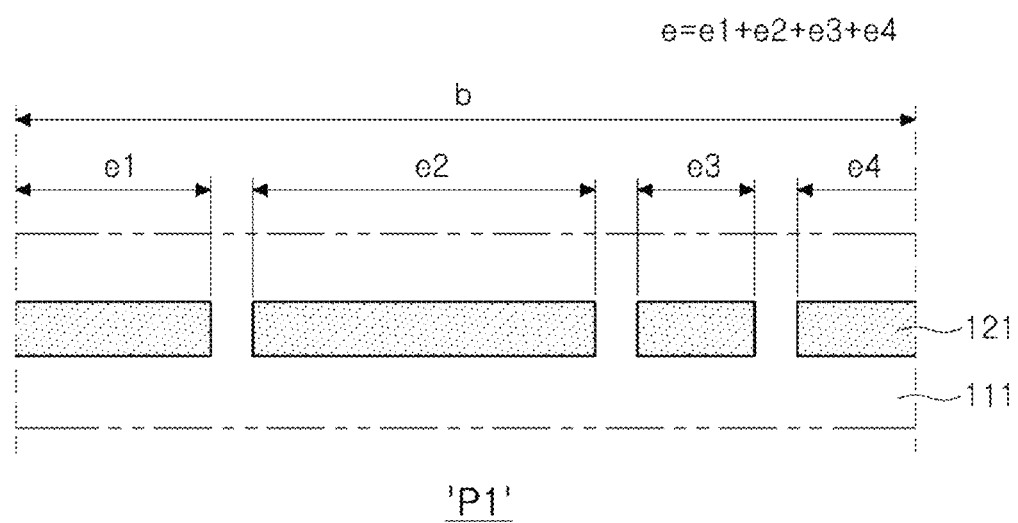
FIG. 7 is an enlarged view of portion 'P1' of FIG. 2.

An enlarged view of portion 'P1' of FIG. 2 is illustrated in FIG. 7. FIG. 7 is a view illustrating a definition of connectivity of internal electrodes, and the connectivity of the internal electrodes in the present embodiment will be described with reference to FIG. 7.

Referring to FIG. 7, if a total length of an internal electrode measured between any two points of the internal electrode is defined as b, and lengths of portions in which the internal electrode is actually formed were defined as e1, e2, e3, and e4, connectivity of the internal electrode may be expressed as e/b, which may be a value obtained by dividing a sum (e=e1+e2+e3+e4) of the lengths of the portions on which the internal electrode is actually formed by the total length (b) of the internal electrode.

As described above, relative values of other specimens were described, based on electrode connectivity of specimen No. 1 as a reference value of 1.

For each specimen, it was determined according to the following criteria and described in Table 1.

O.K: When a relative value is larger than an MTTF reference value of specimen No. 1

N.G: When a relative value is smaller than the MTTF reference value of specimen No. 1

TABLE 1

| Specimen No. | X* [wt %] | Capacitance | MTTF | Electrode Connectivity | Results |
|---|---|---|---|---|---|
| 1 | 0 | 1 | 1 | 1 | — |
| 2 | 0.1 | 1.03 | 1.06 | 1.02 | O.K |
| 3 | 0.5 | 1.03 | 1.26 | 1.02 | O.K |
| 4 | 0.7 | 1.19 | 1.16 | 1.16 | O.K |
| 5 | 1.0 | 1.17 | 1.36 | 1.18 | O.K |
| 6 | 1.5 | 1.22 | 1.64 | 1.20 | O.K |
| 7 | 2.0 | 1.08 | 1.35 | 1.21 | O.K |
| 8 | 2.5 | 1.03 | 1.05 | 1.22 | O.K |
| 9 | 3.0 | 0.89 | 0.91 | 1.22 | N.G |

X*: An In content [wt %] relative to Ni in a composite layer containing Ni and In As can be seen from the experimental results in Table 1, specimen No. 1 represents a case in which a composite layer including Ni and In is not formed at a grain boundary of Ni crystal grains (i.e., In does not exist in the grain boundary). It was confirmed that, in specimen No. 1, since a composite layer containing Ni and In was not formed at a grain boundary of Ni crystal grains, capacitance, MTTF, and electrode connectivity were inferior compared to those of other specimen Nos. 2 to 8.

It was confirmed that, specimen Nos. 2 to 8 were cases in which a composite layer containing Ni and In was formed at a grain boundary of Ni crystal grains, and an In content relative to Ni in the composite layer satisfied 0.1 to 2.5 wt %, to have significant effects of improving capacitance, MTFF, and electrode connectivity.

In particular, in specimen Nos. 2 to 8, an average thickness of the composite layer including Ni and In satisfied 1 to 5 nm. In this case, with respect to an arbitrary dielectric layer extracted from an image in which the length-thickness direction cross-section (the L-T plane) of each of the specimens is scanned with a scanning electron microscope (SEM), an average value of thicknesses was measured at 30 points equally spaced in the length direction.

In addition, in specimen Nos. 2 to 8, an In content included at a grain boundary of Ni crystal grains was higher than an In content included in the Ni crystal grains.

In addition, an In content relative to Ni, in a region of the internal electrode within 3 nm of an interface between the dielectric layer and the internal electrode in a thickness direction of the internal electrode, and in a region of the internal electrode within 3 nm of an outline of each of the plurality of Ni crystal grains, satisfied 0.1 to 2.5 wt %.

Specimen No. 9 was a case in which an In content relative to Ni in a composite layer containing Ni and In provided at a grain boundary of Ni crystal grains exceeds 2.5 wt %, and was confirmed that electrode connectivity thereof was somewhat improved, but capacitance and MTFF thereof were lower and deteriorated than specimen No. 1.

According to the present disclosure, an internal electrode may include a plurality of Ni crystal grains, and a composite layer including Ni and In may be provided at a grain boundary of the Ni crystal grains, to suppress breakage and aggregation phenomena of the internal electrode.

While example embodiments have been illustrated and described above, it will be apparent to those skilled in the art that modifications and variations could be made without departing from the scope of the present disclosure as defined by the appended claims.

What is claimed is:

1. A multilayer ceramic electronic component comprising:
a body including a dielectric layer and an internal electrode alternately disposed with the dielectric layer in a first direction; and
an external electrode disposed on the body and connected to the internal electrode,
wherein the internal electrode includes a plurality of Ni crystal grains, and a composite layer including Ni and In is provided at a grain boundary of each of the plurality of Ni crystal grains.

2. The multilayer ceramic electronic component of claim 1, wherein the composite layer has an average thickness of 1 to 5 nm.

3. The multilayer ceramic electronic component of claim 1, wherein the composite layer completely surrounds at least one Ni crystal grain among the plurality of Ni crystal grains.

4. The multilayer ceramic electronic component of claim 1, wherein an In content relative to Ni in the composite layer is 0.1 wt % or more.

5. The multilayer ceramic electronic component of claim 1, wherein an In content included in the grain boundary of each of the plurality of Ni crystal grains is higher than an In content included in each of the plurality of Ni crystal grains.

6. The multilayer ceramic electronic component of claim 1, wherein an In content relative to Ni in the composite layer is 0.1 to 2.5 wt %.

7. The multilayer ceramic electronic component of claim 1, wherein an In content relative to Ni, in a region of the internal electrode within 3 nm of an interface between the dielectric layer and the internal electrode in a thickness direction of the internal electrode, and in a region of the internal electrode within 3 nm of an outline of each of the plurality of Ni crystal grains, is 0.1 to 2.5 wt %.

8. The multilayer ceramic electronic component of claim 1, wherein the composite layer has an In content of 0.3 to 0.7 wt % and an Ni content of 43.7 to 66.9 wt %, based on a total content.

9. The multilayer ceramic electronic component of claim 1, wherein the internal electrode is formed by a paste for the internal electrode including an Ni powder particle in which a coating layer containing In is disposed as a surface of the Ni powder particle, or an Ni powder particle containing an In alloy,
wherein an In content relative to the Ni powder particle is 0.1 wt % or more.

10. A multilayer ceramic electronic component comprising:
a body including a dielectric layer and an internal electrode alternately disposed with the dielectric layer in a first direction, wherein the internal electrode includes at least one Ni crystal grain, a composite layer including Ni and In is disposed at a grain boundary of the at least one Ni crystal grain, and an In content relative to Ni in the composite layer is 1.0 to 2.5 wt %; and
an external electrode disposed on the body and connected to the internal electrode.

11. The multilayer ceramic electronic component of claim 10, wherein the In content is more than 1.0 wt % and 2.5 wt % or less.

12. The multilayer ceramic electronic component of claim 10, wherein the In content is more than 1.0 wt % and less than 2.5 wt %.

13. The multilayer ceramic electronic component of claim 10, wherein the In content is 1.0 to 2.0 wt %.

14. The multilayer ceramic electronic component of claim 10, wherein the In content is more than 1.0 wt % and 2.0 wt % or less.

15. The multilayer ceramic electronic component of claim 10, wherein the In content is more than 1.0 wt % and less than 2.0 wt %.

16. The multilayer ceramic electronic component of claim 10, wherein the In content is 1.0 to 1.5 wt %.

17. The multilayer ceramic electronic component of claim 10, wherein the In content is more than 1.0 wt % and 1.5 wt % or less.

18. The multilayer ceramic electronic component of claim 10, wherein the composite layer has an average thickness of 1 to 5 nm.

19. The multilayer ceramic electronic component of claim 10, wherein the composite layer completely surrounds the at least one Ni crystal grain.

20. The multilayer ceramic electronic component of claim 10, wherein the In content included in the grain boundary is higher than an In content included in the at least one Ni crystal grain.

21. The multilayer ceramic electronic component of claim 10, wherein the internal electrode includes a plurality of Ni crystal grains, and the composite layer including Ni and In is disposed at a grain boundary of each of the plurality of Ni crystal grains.

* * * * *